US010628697B2

(12) United States Patent
Shinosaki

(10) Patent No.: US 10,628,697 B2
(45) Date of Patent: Apr. 21, 2020

(54) OBJECT APPROACH DETECTION DEVICE AND OBJECT APPROACH DETECTION METHOD

(71) Applicant: Konica Minolta Inc., Chiyoda-ku, Tokyo (JP)

(72) Inventor: Yusuke Shinosaki, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 233 days.

(21) Appl. No.: 15/881,454

(22) Filed: Jan. 26, 2018

(65) Prior Publication Data

US 2018/0247145 A1 Aug. 30, 2018

(30) Foreign Application Priority Data

Feb. 24, 2017 (JP) ................................ 2017-032991

(51) Int. Cl.

*G06K 9/00* (2006.01)
*G06K 9/20* (2006.01)
*G06T 7/13* (2017.01)
*G06K 9/78* (2006.01)
*G06T 7/11* (2017.01)
*G06K 9/46* (2006.01)

(52) U.S. Cl.

CPC ........... *G06K 9/209* (2013.01); *G06K 9/4642* (2013.01); *G06K 9/78* (2013.01); *G06T 7/11* (2017.01); *G06T 7/13* (2017.01); *G06K 9/4604* (2013.01); *G06T 2207/20021* (2013.01)

(58) Field of Classification Search

CPC ........ G06K 9/209; G06K 9/4642; G06K 9/78; G06K 9/4604; G06T 7/13; G06T 7/11; G06T 2207/20021; G01C 11/02

USPC .......................................................... 382/103

See application file for complete search history.

(56) References Cited

U.S. PATENT DOCUMENTS 8,055,126 B2 * 11/2011 Hatakeyama ........ G02B 27/646 359/557
2010/0053320 A1 * 3/2010 Chen ........................ G06K 9/52 348/135

(Continued)

FOREIGN PATENT DOCUMENTS

JP 2014-016309 A 1/2014
JP 2014-062748 A 4/2014

*Primary Examiner* — Van D Huynh
(74) *Attorney, Agent, or Firm* — Squire Patton Boggs (US) LLP

(57) ABSTRACT

An object approach detection device includes: an imager that includes a first and a second lens group which have different focal lengths from each other and are arranged so as to image a same target object and that acquires first and second image information imaged through the first and the second lens group, respectively; an object detector that detects presence or absence of an object; and an object approach determiner that determines that approach of the object has been detected when a time difference between a first time and a second time is equal to or less than an approach determination threshold value, the first time being when the first image information is acquired when the object has been detected based on the first image information, the second time being when the second image information is acquired when the object has been detected based on the second image information.

15 Claims, 12 Drawing Sheets

(56) References Cited

U.S. PATENT DOCUMENTS

| | | | | | |
|---|---|---|---|---|---|
| 2011/0235189 | A1* | 9/2011 | Yamano | G02B 1/105 | 359/704 |
| 2013/0242163 | A1* | 9/2013 | Kuzuhara | G02B 15/14 | 348/345 |
| 2014/0168440 | A1* | 6/2014 | Tsuchiya | B60R 1/00 | 348/148 |
| 2014/0376097 | A1* | 12/2014 | Yamashita | G02B 3/0018 | 359/619 |
| 2015/0156478 | A1* | 6/2015 | Ono | H04N 5/2251 | 348/49 |

* cited by examiner

START
ACQUIRE IMAGE AT FIRST FOCAL LENGTH
11
HAS OBJECT BEEN DETECTED IN IMAGE AT FIRST FOCAL LENGTH?
12
NO
YES
DETECT DETECTION TIME
13
ACQUIRE IMAGE AT SECOND FOCAL LENGTH
14
HAS OBJECT BEEN DETECTED IN IMAGE AT SECOND FOCAL LENGTH?
15
NO
YES
DETECT DETECTION TIME
16
IS TIME DIFFERENCE EQUAL TO OR LESS THAN THRESHOLD VALUE?
17
NO
YES
NOTIFY OF OBJECT APPROACH
18
END

OBJECT APPROACH DETECTION DEVICE AND OBJECT APPROACH DETECTION METHOD

The entire disclosure of Japanese patent Application No. 2017-032991, filed on Feb. 24, 2017, is incorporated herein by reference in its entirety.

BACKGROUND

Technological Field

The present invention relates to an object approach detection device and an object approach detection method.

Description of the Related Art

Conventionally, as a detection device or a detection method of an approaching object, there has been known one that detects a surrounding object by using a stereo camera or the like and measures the distance to the object.

Moreover, JP 2014-16309 A discloses a device which uses a lens unit constituted by a main lens and a lens array, in which microlenses whose focal lengths can be varied are two-dimensionally arranged, to estimate the distance based on image information corresponding to each focal length.

JP 2014-62748 A discloses a device which uses a multi-focal lens having a plurality of focusing lengths to capture an image simultaneously for each of the plurality of focusing lengths to acquire a plurality of images, and detects a position of a moving object in a three-dimensional space based on the plurality of acquired images.

In the device described above in JP 2014-16309 A, the distance estimation is performed based on the image information corresponding to each focal length so that the amount of the calculation for this becomes large, and the power consumption increases.

Moreover, in the device in JP 2014-62748 A, the focal length that best focuses from image information on the plurality of focal lengths, that is, a distance z to the object is estimated and calculated, and the xy position of the object is detected based on this to obtain the three-dimensional position (x, y, z) of the object. Furthermore, the three-dimensional position is detected at each predetermined time to obtain a movement locus of the object. Thus, the amount of the calculation also becomes large, and the power consumption increases.

In recent years, a detection device which detects the approach of an object is also mounted on a small flying machine such as a drone, and thus prevention of a crash due to collision has been intended.

In this small flying machine, it is necessary to detect an approaching object at a wide angle over a wide range in order to detect objects from various directions. However, in order to detect an approaching object at a wide angle, a plurality of cameras are necessary. In a case where a stereo camera is used, the number of camera modules increases, the weight increases, and the flight time becomes short.

Thus, although a monocular system can be considered, focusing is necessary for distance measurement of an approaching object, and focusing takes time so that images cannot be acquired at the same time. Moreover, since a focusing lens and a driving mechanism are necessary, the lens becomes heavy, and the flight time becomes short.

Furthermore, as described above, the amount of the calculation becomes large, and the power consumption increases in the ones that estimate the distance to the object. In addition, the flight time becomes short in a small flying machine with a limited power source capacity.

SUMMARY

The present invention has been made in light of the above problems, and an object of the present invention is to provide an object approach detection device and the method thereof, which can reduce the amount of calculation for detecting an approaching object and reduce power consumption.

To achieve the abovementioned object, according to an aspect of the present invention, an object approach detection device reflecting one aspect of the present invention comprises: an imager that includes a first lens group and a second lens group which have different focal lengths from each other and are arranged so as to image a same target object and that acquires first image information and second image information imaged through the first lens group and the second lens group, respectively; an object detector that detects presence or absence of an object based on the first image information and the second image information; and an object approach determiner that determines that approach of the object has been detected when a time difference between a first time and a second time is equal to or less than an approach determination threshold value, the first time being when the first image information is acquired when the object has been detected based on the first image information, the second time being when the second image information is acquired when the object has been detected based on the second image information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
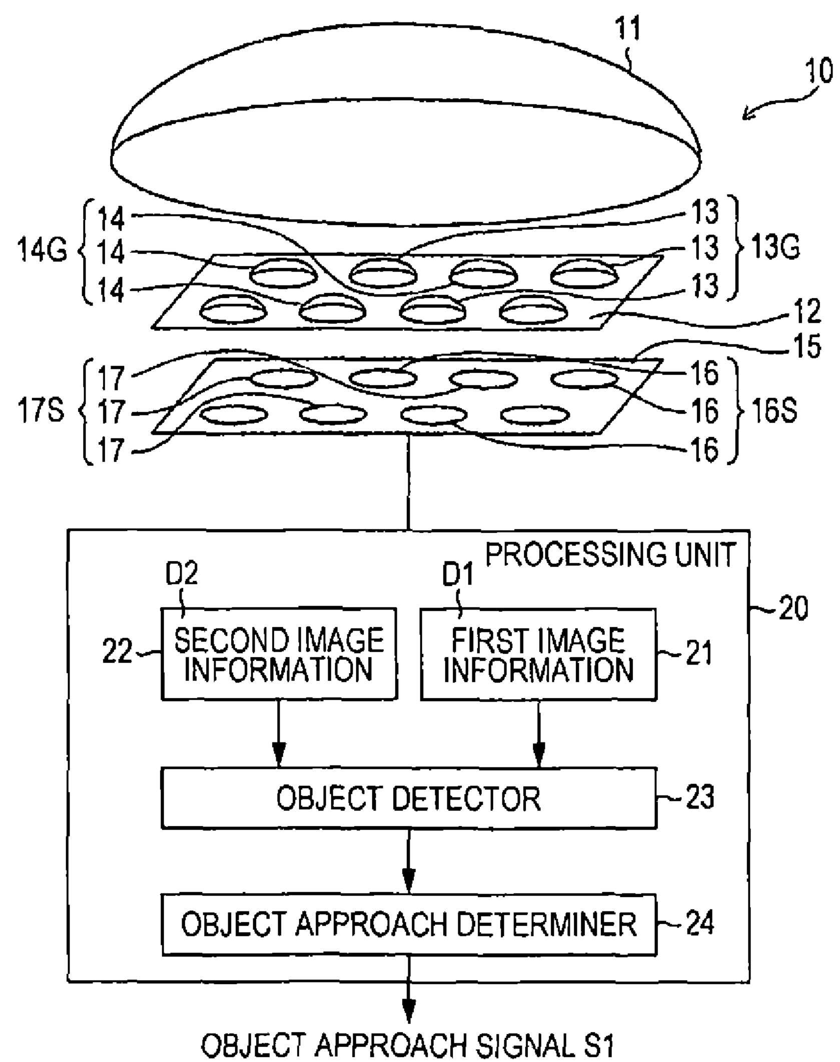
FIG. 1 is a diagram showing the schematic configuration of an object approach detection device according to an embodiment of the present invention.
Figure 2:
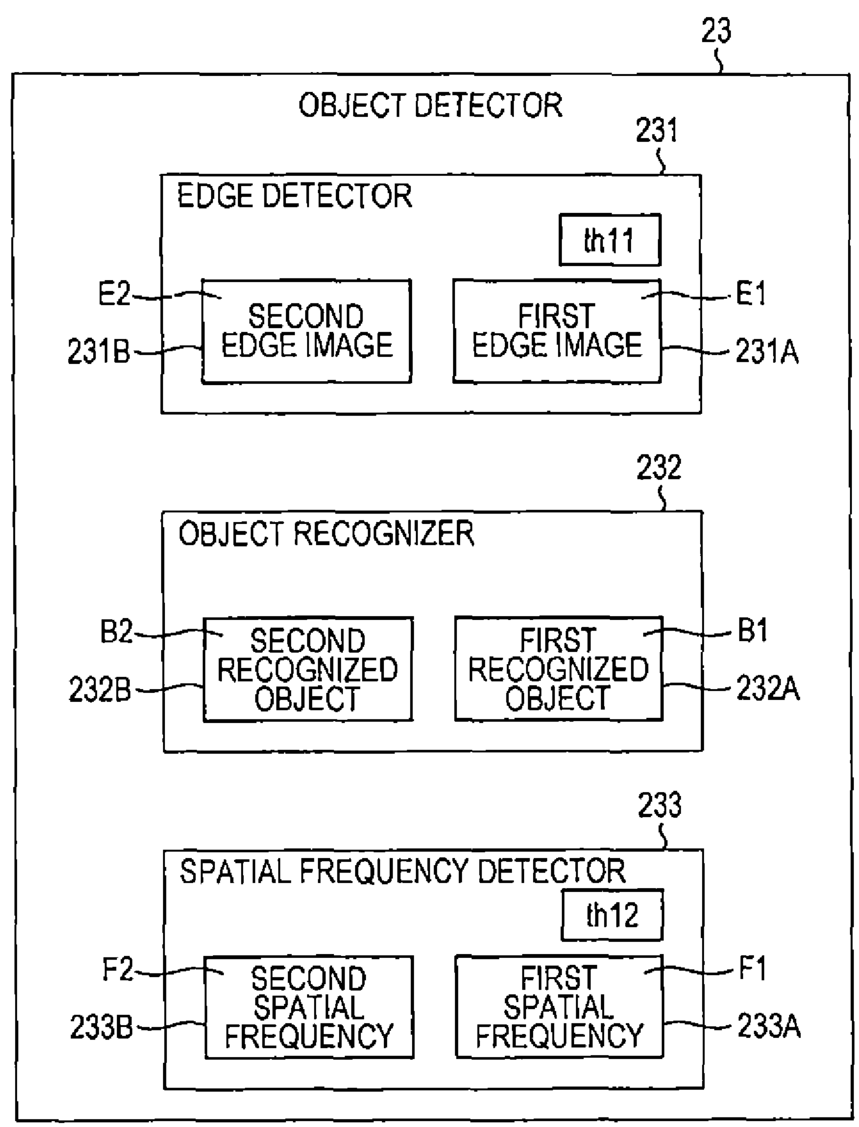
FIG. 2 is a diagram showing an example of the functional configuration of an object detector.
Figure 3:
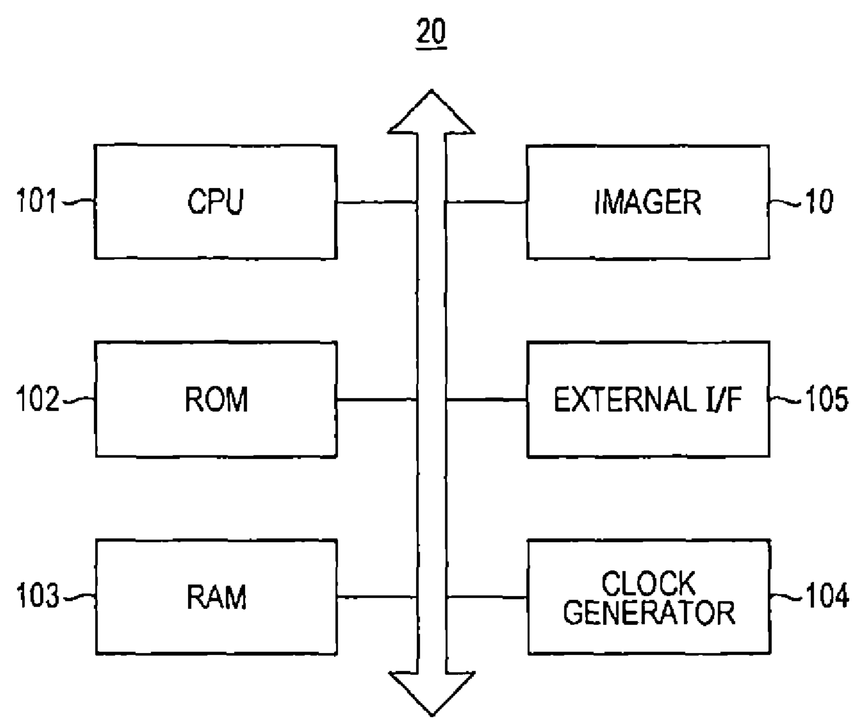
FIG. 3 is a block diagram showing the hardware configuration of the object approach detection device.

FIG. 1 shows the schematic configuration of an object approach detection device 1 according to an embodiment of the present invention. FIG. 2 is a diagram showing an example of the functional configuration of an object detector 23. FIG. 3 shows an example of the hardware configuration of the object approach detection device 1.

In FIG. 1, the object approach detection device 1 has an imager 10 and a processing unit 20.

The imager 10 includes a main lens 11, a first lens group 13G and a second lens group 14G which have different focal lengths from each other and are arranged so as to image the same target object and, and acquires first image information D1 and second image information D2 imaged through each of the main lens 11, the first lens group 13G and the second lens group 14G.

The main lens 11 is for collecting light, expanding the target range of the imaging and enlarging the viewing angle (widening angle).

The first lens group 13G is a lens array including a plurality of first lenses 13, 13 and so on having a first focal length. The second lens group 14G is a lens array including a plurality of second lenses 14, 14 and so on having a second focal length.

The plurality of first lenses 13, 13 and so on and the plurality of second lenses 14, 14 and so on are arranged on one object plane 12. In this example, the object plane 12 is flat and may be a transparent object such as glass or may be a virtual plane. Alternatively, the object plane may be curved instead of being flat.

The imager 10 further has a first imaging element 16S which receives the light having passed through the first lens group 13G and outputs the first image information D1 and a second imaging element 17S which receives the light having passed through the second lens group 14G and outputs the second image information D2. The first imaging element 16S and the second imaging element 17S include imaging elements 16 and 17 corresponding to the lenses 13 and 14, respectively, and synthesizes the first image information D1 and the second image information D2 for each focal length based on the images captured by these elements.

The first imaging element 16S and the second imaging element 17S are arranged to face the object plane 12. That is, they are arranged along a flat imaging plane 15 facing the object plane 12. Note that, although a part of the imaging plane 15 is the first imaging element 16S and the second imaging element 17S herein, it is also possible to use the entire imaging plane 15 as an imaging element and extract a necessary part of image information to be synthesized.

Note that the first lens group 13G is a lens group with a long focusing length L and the second lens group 14G is a lens group with a short focusing length L in the present embodiment. Suppose that the focusing length of the first lens group 13G is L1 and the focusing length of the second lens group 13G is L2. Then, L1 is longer than L2, L1>L2. That is, the first focal length of the first lenses 13 is longer than the second focal length of the second lenses 14.

Therefore, the first lenses 13 focus on a more distant object and the second lenses 14 focus on an object closer than the case of the first lenses 13. Thus, in a case where the object approaches the imager 10 from a long distance, the first image information D1 focused by the first lens group 13G is acquired first, and the second image information D2 focused by the second lens group 14G is acquired thereafter.

Imaging is performed continuously, that is, periodically by the imager 10 at predetermined time intervals for a target range of a predetermined viewing angle, and the first image information D1 and the second image information D2 are acquired at the respective timings. At this time, time stamps (digital time stamps) DTS indicating the timings of imaging are acquired. The time stamp DTS indicates a time t at which each of the first image information D1 and the second image information D2 is acquired. As an example of the time t, it can be shown as "Jan. 30, 2017 13:10:25 27," "15:52:18 78," "17:21:25:66," or the like.

The time interval of the imaging at the imager 10 can be, for example, 1/60 seconds, 1/30 seconds, 1/10 seconds, one second, two seconds, or the like. In a case where it is desired to increase the speed of object approach detection, the time interval may be short. In a case where the speed of the detection may be slow, the time interval may be long. Moreover, a moving image with an appropriate frame rate such as 60 frames per second (fps), 30 fps or 25 fps may be acquired, and still images and the like may be extracted from the moving image.

As the imager 10, it is possible to use a camera or a video camera in which a lens, an imaging element and the like are integrally formed. The image information D1 and D2 to be acquired may be RGB color image information or may be monochrome image information, infrared or ultraviolet ray image information, or other image information.

The processing unit 20 has image storage 21 and 22, an object detector 23 and an object approach determiner 24.

The image storage 21 and 22 respectively store the first image information D1 and the second image information D2 acquired and transferred by the imager 10.

The object detector 23 detects the presence or absence of an object based on the first image information D1 and the second image information D2.

As shown well in FIG. 2, the object detector 23 has, for example, an edge detector 231 that performs edge detection on the first image information D1 and the second image information D2, and detects the presence of the object when the edge is equal to or greater than an edge detection threshold value th11. A first edge image E1 and a second edge image E2 are stored in storage 231A and 231B.

The object detector 23 also has an object recognizer 232 that performs image recognition based on the first image information D1 and the second image information D2 to recognize the object. The object approach determiner 24 can determine that the approach of the object has been detected on the condition that the objects (recognized objects) B recognized by the object recognizer 232 are the same. A first recognized object B1 and a second recognized object B2 are stored in storage 232A and 232B.

The object detector 23 also has a spatial frequency detector 233 that detects spatial frequencies F1 and F2 of the first image information D1 and the second image information D2, and detects the presence of the object when the spatial frequencies F1 and F2 are equal to or greater than a frequency detection threshold value th12.

At this time, for example, the first image information D1 and the second image information D2 are each divided into a plurality of regions, and the edge detection or the spatial frequency detection is performed on each region of the image information.

A first spatial frequency F1 and a second spatial frequency F2 are stored in storage 233A and 233B.

Moreover, for example, the object detector 23 detects the presence or absence of an object first based on the image information corresponding to the lens group with the long focusing length L among the first image information D1 and the second image information D2, and detects the presence or absence of the object based on other image information only when the presence of the object has been detected.

Note that, in the object detector 23, various known techniques can be used for the configuration and a series of processing in the edge detector 231, the object recognizer 232 and the spatial frequency detector 233. Moreover, it is also possible to adopt a configuration in which a part of them is omitted.

The object approach determiner 24 determines that the approach of the object has been detected when a time difference Δt between a first time ta and a second time tb is equal to or less than an approach determination threshold value th1. The first time ta is when the first image information D1 is acquired when the object has been detected based on the first image information D1. The second time tb is when the second image information D2 is acquired when the object has been detected based on the second image information D2. When the approach of the object is determined to be detected, an object approach signal S1 is out.

For example, the object approach determiner 24 can determine that the approach of the object has been detected on the condition that the region in which the object has been detected corresponds to a region into which the first image information D1 and the second image information D2 are divided or is a region adjacent thereto.

Moreover, for example, the object approach determiner 24 can determine that the approach of the object is not detected in a case where the object detector 23 detects the presence of the object based on the image information corresponding to the lens group with the short focusing length L prior to the image information corresponding to the lens group with the long focusing length L among the first image information D1 and the second image information D2.

Furthermore, the object approach determiner 24 has a high-speed approach determination threshold value th2 that is smaller than the approach determination threshold value th1, and determines that the high-speed approach of the object has been detected when the time difference Δt is equal to or less than the high-speed approach determination threshold value th2.

Note that the real objects to be imaged by the imager 10 are described as “object BT,” “object BT1,” “object BT2,” and the like, and the recognizing objects to be detected or recognized based on the imaged image information D are described as “object B,” “object B1,” “object B2,” and the like. However, the distinction between the real objects and the recognizing objects is not strict.

As shown in FIG. 3, the processing unit 20 is constituted by, for example, a CPU 101, a ROM 102, a RAM 103, a clock generator 104, an external I/F 105 and the like, which are connected by a bus or the like.

The central processing unit (CPU) 101 controls each part and the whole of the object approach detection device 1 according to a program (computer program). For example, the CPU 101 can be formed by application specific integrated circuit (ASIC). The functions and the like of the processing unit 20 can be realized by the executing a predetermined program by the CPU 101 and in cooperation with hardware elements.

The read only memory (ROM) 102 and the random access memory (RAM) 103 can be realized by a semiconductor, a magnetic disk, or the like, and store control programs, application programs, data, image information and the like. The RAM 103 is used as a working memory, and a part thereof is used as the image storage 21 and 22.

The clock generator 104 generates clocks necessary for the series of processing in the processing unit 20 and provides, for example, clocks for counting by a counter and the time stamps DTS.

The external I/F 105 receives and transmits data and signals from and to other devices. For example, the external I/F is connected to an operation control unit and the like of a flying machine such as a drone and can transmit the object approach signal S1, the determination result in the processing unit 20, to the operation control unit. The operation control unit may perform, for example, operation for collision avoidance when the object approach signal S1 is received.

Figure 4:
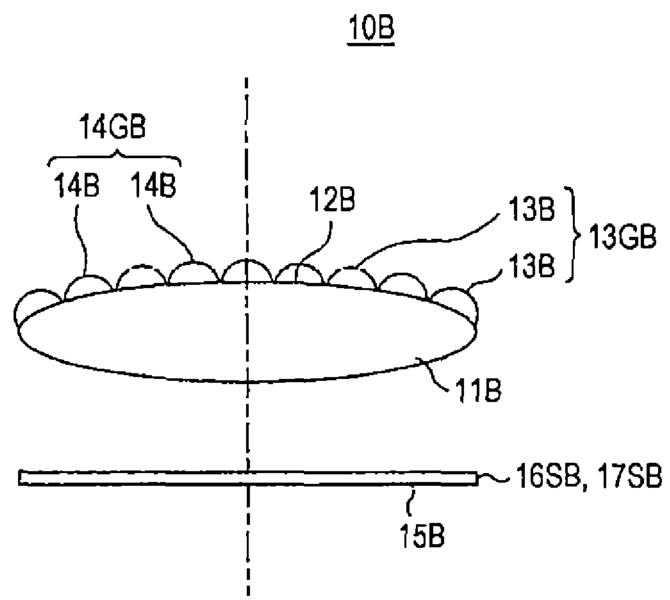
FIG. 4 is a diagram showing another example of the lens configuration of an imager of the object approach detection device.
Figure 5:
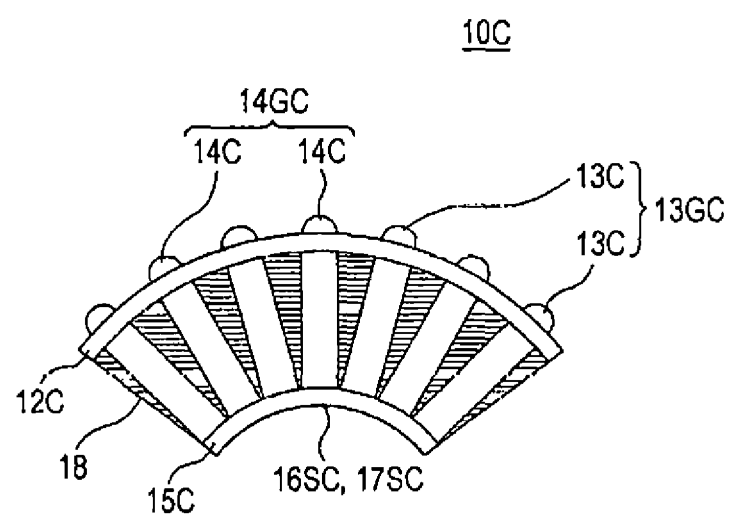
FIG. 5 is a diagram showing still another example of the lens configuration of the imager of the object approach detection device.
Figure 6:
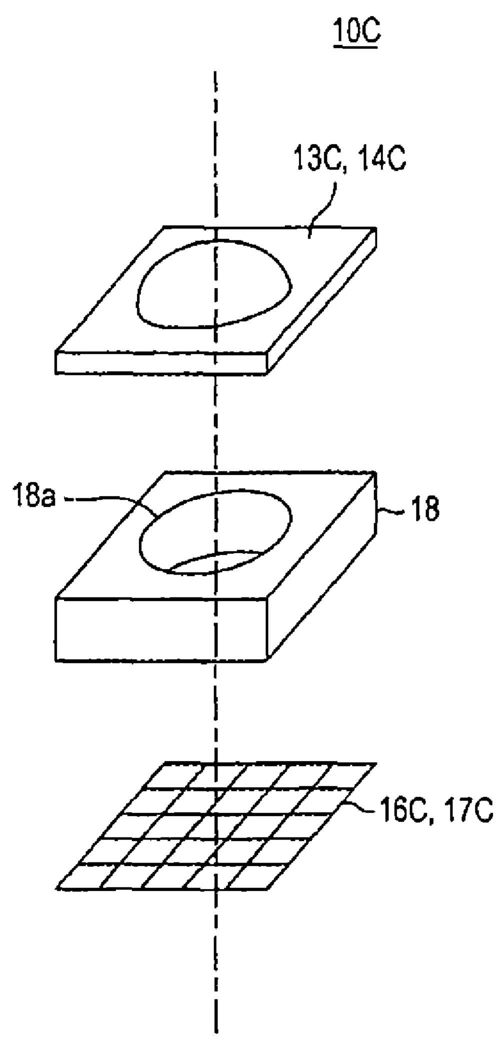
FIG. 6 is an enlarged view showing one lens in the imager shown in FIG. 5.

FIGS. 4 to 6 show imagers 10B and 10C showing other examples of the lens configuration of the object approach detection device 1.

In FIG. 4, the imager 10B includes a main lens 11B, a first lens group 13GB constituted by a plurality of first lenses 13B, 13B and so on having a first focal length, and a second lens group 14GB constituted by a plurality of second lenses 14B, 14B and so on having a second focal length.

In the example in FIG. 4, the surface of the main lens 11B is the object plane 12, and the lenses 13B and 14B are arranged along the object plane 12. A first imaging element 16SB and a second imaging element 17SB are arranged on an imaging plane 15B facing the object plane 12.

In FIG. 5, an imager 10C includes a first lens group 13GC constituted by a plurality of first lenses 13C, 13C and so on having a first focal length and a second lens group 14GC constituted by a plurality of second lenses 14C, 14C and so on having a second focal length.

In the example in FIG. 5, the first lenses 13C and the second lenses 14C are arranged on a circumferential or spherical object plane 12C.

A first imaging element 16SC and a second imaging element 17SC are arranged on a circumferential or spherical imaging plane 15C facing the object plane 12C.

Moreover, in all of the imagers 10, 10B and 10C, the first lenses 13, 13B and 13C and the second lenses 14, 14B and 14C are arranged alternately, specifically, arranged in zigzag on the object planes 12, 12B and 12C and are arranged in a matrix as a whole.

In the imager 10C in FIG. 5, shielding walls 18 are provided between the first lenses 13C and the second lenses 14C and the first imaging element 16SC and the second imaging element 17SC to shield the optical paths to the outside of the corresponding regions.

For example, as shown in FIG. 6, each of the shielding walls 18 may be block-shaped provided with one light transmission hole 18*a*. Each of the shielding walls 18 is inserted between the first lenses 13C (or the second lenses 14C) and the first imaging element 16C (or the second imaging element 17C).

Note that the shielding wall 18 may be placoid provided with a large number of light transmission holes 18*a* corresponding to each lens.

Figure 7:
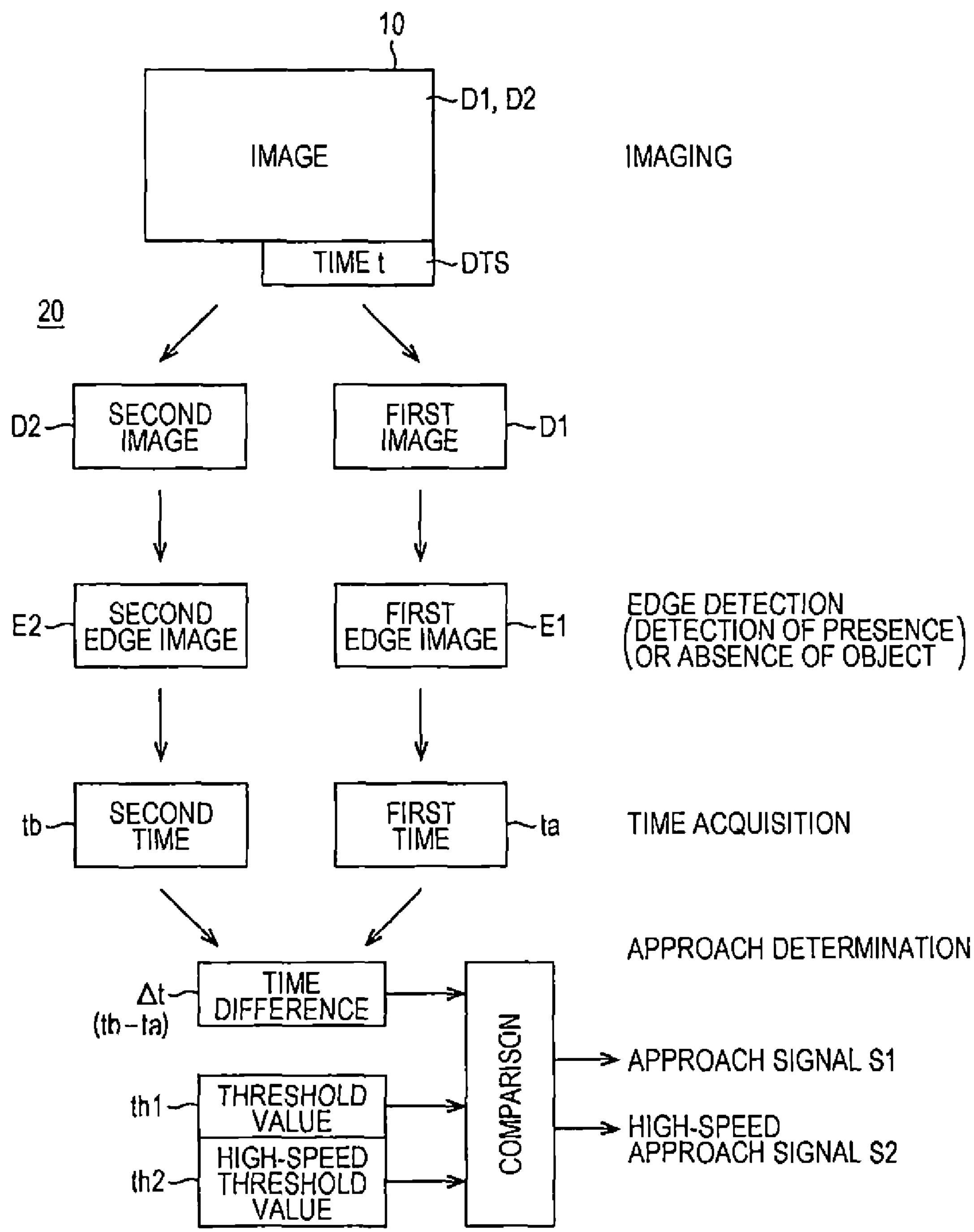
FIG. 7 is a diagram showing a schematic flow of a series of processing in a processing unit of the object approach detection device.

FIG. 7 shows an example of a flow of a series of processing for the object approach detection in the processing unit 20.

In FIG. 7, an image such as a still image or a moving image in a target range is captured by the imager 10, the first image information D1 and the second image information D2 are acquired from the image, and the time stamp DTS is acquired at the same time. A set of the first image information D1 and the second image information D2 is acquired at predetermined time intervals and sent to the processing unit 20 sequentially.

In the processing unit 20, the edge detection is performed on one set of the first image information D1 and the second image information D2, and the first edge image E1 and the second edge image E2 are acquired. The presence or absence of an object is detected based on these edge images. When an object is detected, the time t is acquired from the time stamp DTS corresponding to that first image information D1 or that second image information D2.

Normally, when an object approaches the imager 10 from a long distance, the first image information D1 focused by the first lens group 13G is acquired first, and the second image information D2 focused by the second lens group 14G is acquired thereafter. In this case, for example, the time ta is acquired for the first image information D1 and, for example, the time tb is acquired for the second image information D2. The time ta is earlier, and the time tb is later.

In this case, the time difference Δt between the time ta and the time tb is tb−ta, and this time difference Δt is a time taken by the object to move from the focusing length L1 of the first lens group 13G to the focusing length L2 of the second lens group 14G. If the focusing lengths L1 and L2 are each constant, the moving speed of the object becomes faster as the time difference Δt becomes smaller.

Thereupon, the time difference Δt is compared with the approach determination threshold value th1. When the time difference Δt is equal to or less than the approach determination threshold value th1, the approach of the object is determined to be detected, and the object approach signal S1 is out.

Moreover, the time difference Δt is compared with the high-speed approach determination threshold value th2 as necessary. When the time difference Δt is equal to or less than the high-speed approach determination threshold value th2, the high-speed approach of the object is determined to be detected, and a high-speed object approach signal S2 is out. The high-speed approach determination threshold value th2 is smaller than the approach determination threshold value th1 and may be, for example, equal to or less than half. For example, in a case where the approach determination threshold value th1 is one second, the high-speed approach determination threshold value th2 can be set to about 0.5 seconds.

This will be described in more detail hereinafter.

Figure 8A:
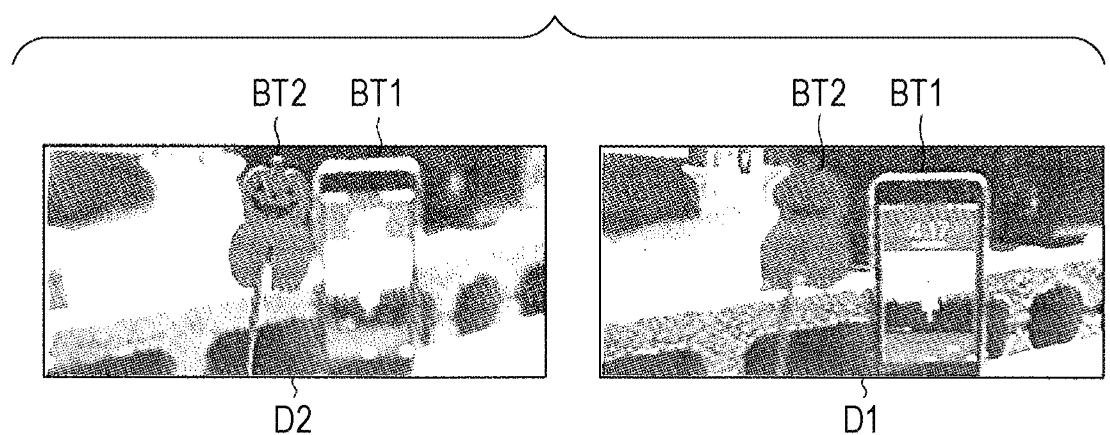
FIGS. 8A and 8B are diagrams showing examples of image information and edge images in the object approach detection device.
Figure 8B:
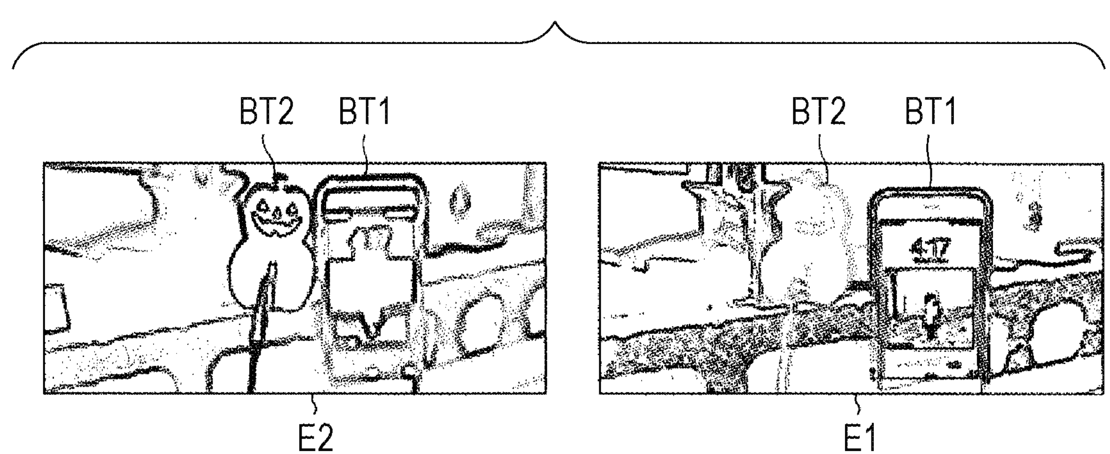

FIG. 8A shows examples of the image information D1 and D2, and FIG. 8B shows examples of the edge images E1 and E2 thereof.

In FIG. 8A, the image information D1 is the image captured by the first lens group 13G and focused on the focusing length L1 of the first lens group 13G. The image information D2 is the image captured by the second lens group 14G and focused on the focusing length L2 of the second lens group 14G.

In these image information D1 and D2, the different objects (real objects) BT1 and BT2 are in the background, and the object BT1 is arranged farther from the imager 10 than the object BT2. The farther object BT1 is in focus in one image information D1 while the closer object BT2 is in focus in the other image information D2.

The edge image E1 in FIG. 8B is the result of performing the edge detection on the image information D1, and the edge image E2 is the result of performing the edge detection on the image information D2.

As a method of the edge detection, there are, for example, a method of obtaining a density gradient by differentiating the image density (luminance), a method of obtaining a density difference between adjacent pixels, and other methods. In an image of a focused object, the density gradient and the density difference tend to increase at the edges. Therefore, for example, in a case where a ratio of a part of the areas with large density gradient and density difference to the entire image is equal to or greater than a certain value, in a case where the number of pixels with large density gradient and density difference between adjacent pixels is equal to or greater than a certain number or certain ratio, and the like, it is possible to detect the presence of the focused object BT.

In the edge image E1 in FIG. 8B, the edges clearly appear on the focused object BT1, and in the edge image E2, the edges clearly appear on the focused object BT2. Therefore, in this case, the object BT1 is detected in the image information D1 or the edge image E1, and the object BT2 is detected in the image information D2 or the edge image E2.

Figure 9A:
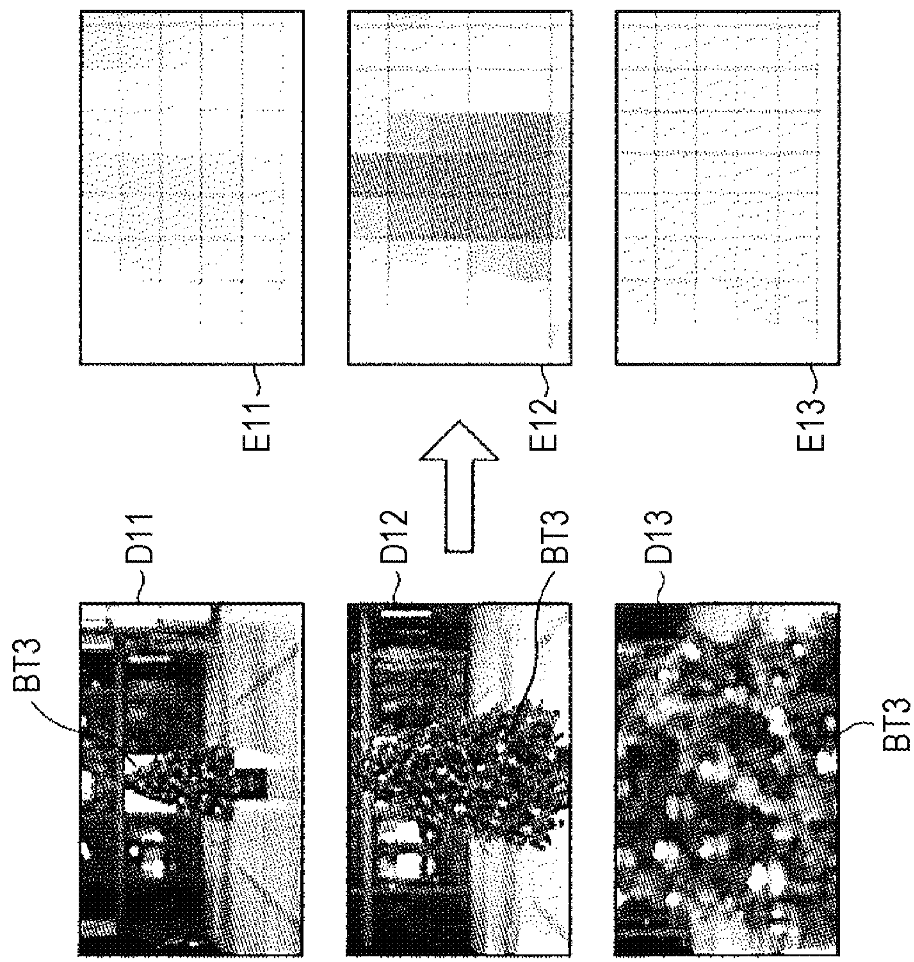
FIGS. 9A to 9C are diagrams show how an object is detected from the image information.
Figure 9B:
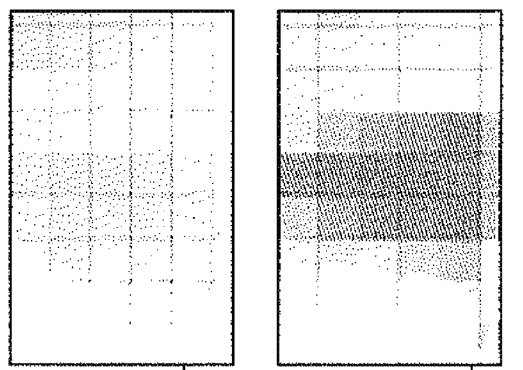
Figure 9C:
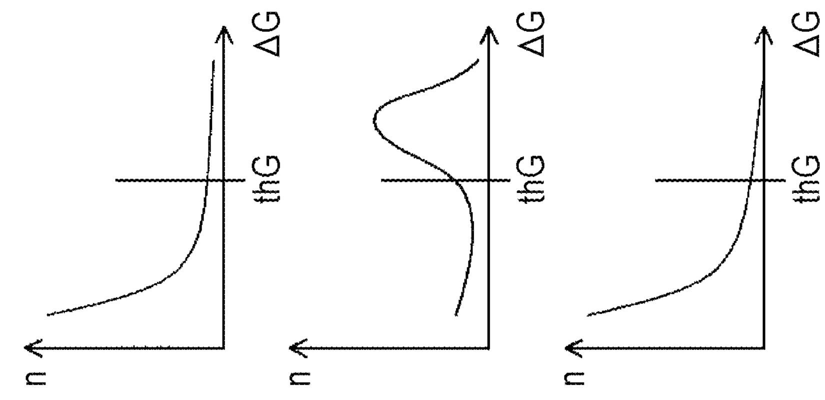

FIGS. 9A to 9C show how an object is detected from the image information.

FIG. 9A shows image information D11, D12 and D13. FIG. 9B shows edge images E11, E12 and E13 obtained from the image information D11, D12 and D13, respectively. FIG. 9C shows frequency distribution curves of density differences ΔG of the adjacent pixels in the edge images E11, E12 and E13, respectively.

In FIG. 9A, the image information D11, D12 and D13 are obtained by imaging the object (real object) BT3 arranged at the center of the screen at different distances. Among them, in the image information D12 in the center, the object BT3 is at the focusing length and focused.

In FIG. 9B, in the edge images E11, E12 and E13, the pixels after the edge detection are enlarged to be shown. Among them, the difference of the intensities, that is, the contrast is large in the edge image E12, and the edges are detected most frequently.

In FIG. 9C, each of the horizontal axes represents the density difference ΔG of each pixel, and each of the vertical axes represents the number (pixel number) n. An appropriate position on each of the horizontal axes is set as a threshold value thG, and the total number NTG of the pixels with the density difference ΔG exceeding the threshold value thG is checked. The total number NTG corresponds to the area at the lower part of the curve. It is shown that the edge image E12 in the middle has the largest total number NTG.

Therefore, for example, in a case where the threshold value thG indicating the pixels of the edges is set and the total number NTG of pixels exceeding the threshold value thG is equal to or greater than the edge detection threshold value th11, the presence of the object B should be detected in that edge image E or image information D.

Note that, in the image information D, the difference of the intensities becomes larger, that is, the contrast becomes large by including a clear focused image, and the spatial frequency F tends to be high. That is, the focused image information D has the high spatial frequency F.

Thereupon, the spatial frequency F of each of the image information D11, D12 and D13 may be detected, and the presence of the object may be detected when the spatial frequency F is equal to or greater than the frequency detection threshold value th12.

In this case, the spatial frequencies F1 and F2 of the first image information D1 and the second image information D2 are detected respectively by the spatial frequency detector 233. The presence of an object should be detected when the spatial frequencies F1 and F2 are equal to or greater than the frequency detection threshold value th12.

Figure 10A:
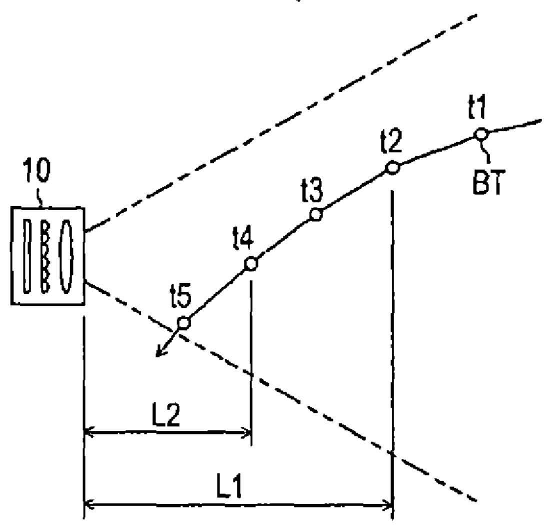
FIGS. 10A and 10B are diagrams showing a schematic flow of a series of processing in an object approach determiner.
Figure 10B:
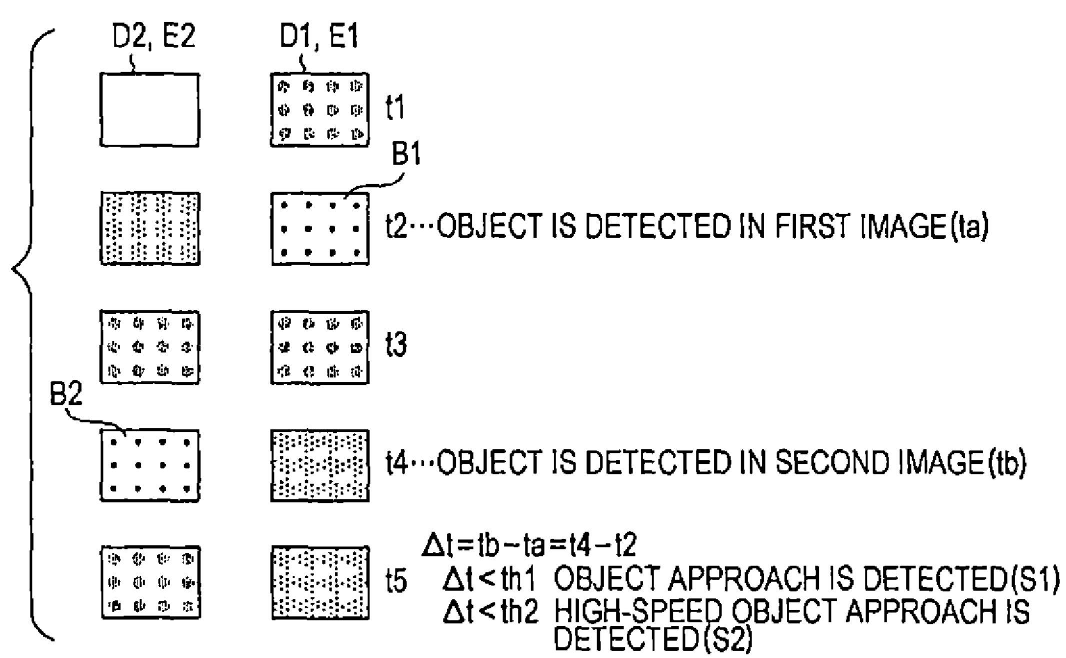

FIGS. 10A and 10B are diagrams showing a schematic flow of the series of processing in the object approach determiner 24.

FIG. 10A shows how the object BT enters into the viewing field of the imager 10 and approaches with the time t. The imaging is performed by the imager 10 at times t1, t2, t3, t4 and t5. The object BT is positioned at the focusing length L1 of the first lens group 13G at the time t2 and positioned at the focusing length L2 of the second lens group 14G at the time t4.

In FIG. 10B, the image information D1 and D2 imaged at each time t are schematically shown. At the time t1, the unfocused image information D1 and the image information D2 substantially with nothing are obtained. At the time t2, the focused image information D1 and the unfocused image information D2 are obtained. At the time t3, the unfocused image information D1 and D2 are obtained. At the time t4, the unfocused image information D1 and the focused image information D2 are obtained. At the time t5, the unfocused image information D1 and D2 are obtained.

From these image information D1 and D2, the edge images E1 and E2 are respectively obtained by the edge detection, and the detection of the object BT is performed. In this example, the objects (recognized objects) B1 and B2 are detected from the focused image information D1 at the time t2 and the focused image information D2 at the time t4, respectively.

As a result, the object B1 is detected at the focusing length L1 at the time t2, and the object B2 is detected at the focusing length L2 at the time t4. That is, the first time ta when the object B1 is detected based on the first image information D1 is the "time t2," and the second time tb when the object B2 is detected based on the second image information D2 is the "time t4." Therefore, the time difference $\Delta t$ (=tb−ta) between the first time ta and the second time tb is $\Delta t = t4 - t2$.

Then, when the time difference $\Delta t = t4 - t2$ is less than the approach determination threshold value th1, that is, when $\Delta t < th1$, the approach of the object is determined to be detected, and the object approach signal S1 is out.

Moreover, when the time difference $\Delta t = t4 - t2$ is less than the high-speed approach determination threshold value th2, that is, $\Delta t < th2$, the high-speed approach of the object is determined to be detected, and the high-speed object approach signal S2 is out.

Note that, the determination of the detection of the object approach may include a case where the time difference $\Delta t$ is equal to the threshold values th1 or th2.

Next, various conditions for the determination of the detection of the object approach will be described.

First, in the examples shown in FIGS. 10A and 10B, since the same single object BT is imaged, the detected object B1 (the first recognized object) and the object B2 (the second recognized object) are determined to be the same in the object recognizer 232.

In this case, the object approach determiner 24 can determine that the approach of the object has been detected on the condition that the objects B1 and B2 recognized by the object recognizer 232 are the same. That is, in a case where such determination is performed, the approach of the object is determined to be not detected if the objects B1 and B2 are different from each other. Therefore, the object approach signal S1 is not out.

Figure 11:
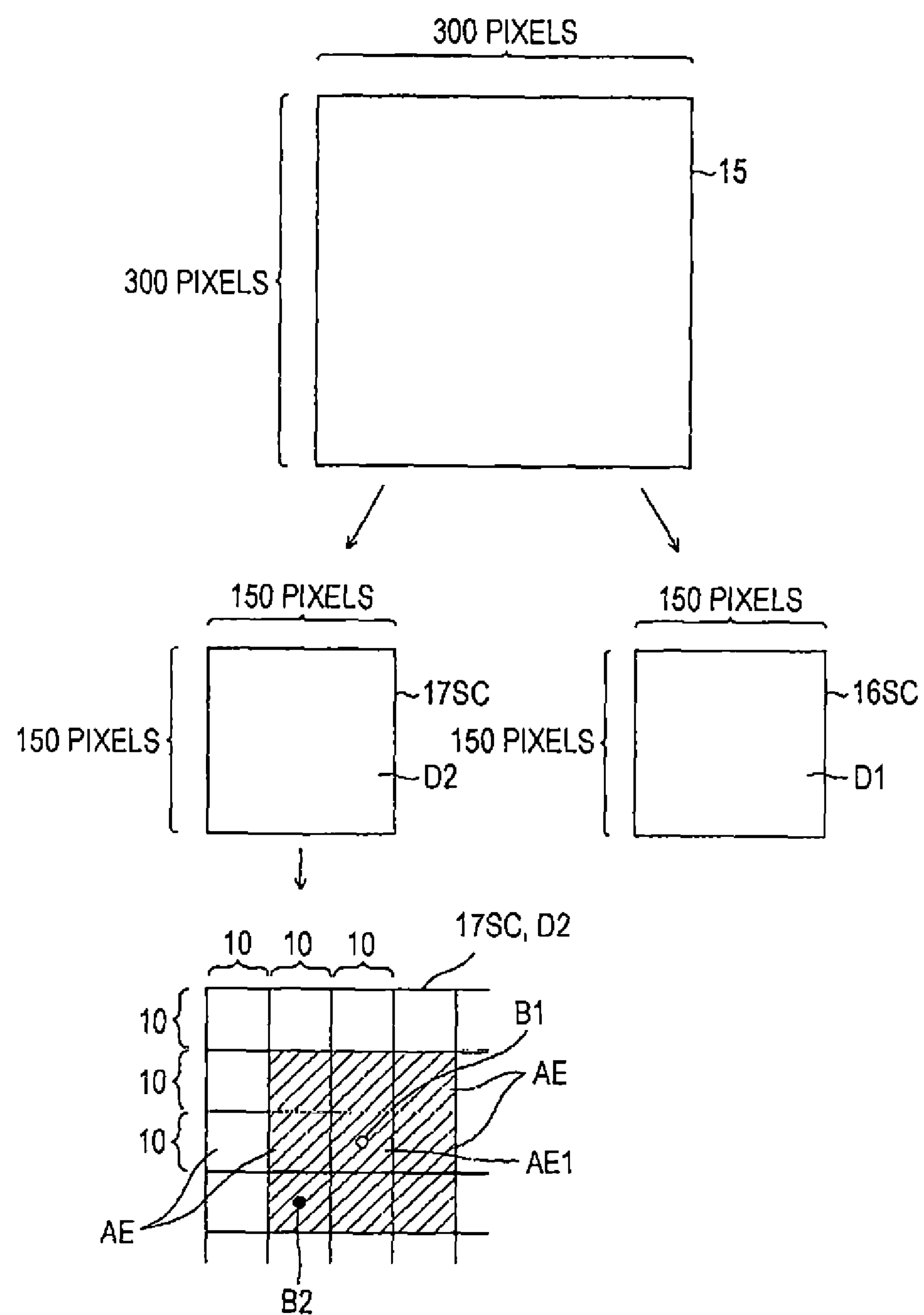
FIG. 11 is a diagram showing how the approach of the object is detected by dividing a region of image information.

Next, FIG. 11 shows how the approach of the object is detected by dividing the region of the image information D.

In the example in FIG. 11, 300 vertical pixels and 300 horizontal pixels are aligned in a matrix on the imaging plane 15. The imaging plane 15 includes the first imaging element 16SC and the second imaging element 17SC. For example, 150 vertical pixels and 150 horizontal pixels are assigned as the first imaging element 16SC and the second imaging element 17SC, and the first image information image D1 and the second image information image D2 are obtained, respectively.

In the first imaging element 16SC and the second imaging element 17SC, the first image information image D1 and the second image information image D2 are divided into regions AE with a predetermined size. In this example, the images are divided into the matrix regions AE, each with 10 vertical pixels and 10 horizontal pixels. In the first image information image D1 and the second image information image D2, the positional relationships of the regions AE correspond to each other.

Then, the object approach determiner 24 can determine that the approach of the object has been detected on the condition that each of the detected regions AE corresponds to a region AE into which the first image information D1 and the second image information D2 are divided or is a region AE adjacent thereto in a case where the objects B1 and B2 have been detected.

That is, in this case, in the second image information D2 shown in FIG. 11, the approach of the object is determined to be detected only in a case where the object B2 has been detected in a region AE1 in which the object B1 has been detected in the first image information D1, or in any one of the eight regions AE adjacent to this region AE1 from the top, bottom, left and right. Thus, the approach of the object can be detected with higher accuracy.

Moreover, since the region AE in which the objects B1 and B2 have been detected can be identified, the spatial positions of the objects B1 and B2 can also be identified.

Note that the size and setting method of the region AE in this case may be various.

Figure 12:
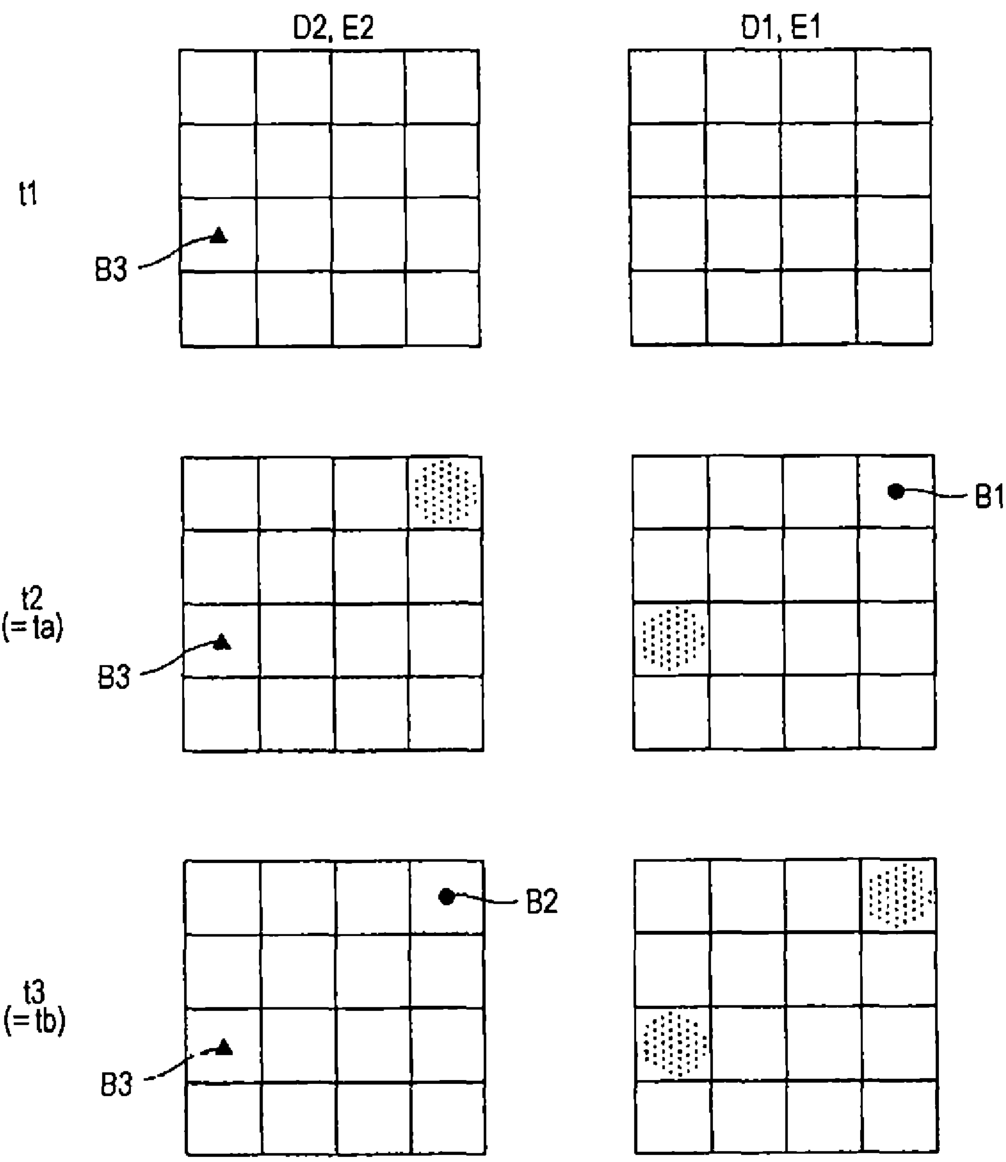
FIG. 12 is a diagram showing an example of determining the approach to be not detected even an object is detected.

FIG. 12 shows an example of a case where the approach is determined to be not detected even when the object is detected. In FIG. 12, the image information D1 and D2 imaged at each time t are schematically shown.

That is, the imaging is performed at the times t1, t2 and t3 by the imager 10. At the time t1, no object is detected from image information D1, and the object B3 is detected from the image information D2. At the time t2, the object B1 is detected from the image information D1, and the object B3 is detected from the image information D2. At the time t3, no object is detected from the image information D1, and the two objects (recognized objects) B2 and B3 are detected from the image information D2.

In such a case, since the presence of the object B3 has been detected at the time t1 based on the second image information D2 corresponding to the lens group with the short focusing length L2 prior to the first image information D1 corresponding to the lens group with the long focusing length L1, the approach of the object is determined to be not detected, and the object approach signal S1 is not out.

That is, the object B3 detected based on the second image information D2 is detected at all of the times t1, t2 and t3, and this is a case where there is an object different from the object BT which should be detected at a position of the focusing length L2, other objects have been crossed, or the like, leading to erroneous detection. Thus, the object approach signal S1 is not out herein.

What can be considered for such a situation is, for example, a case where the position of the imager 10 attached to the flying machine is close to the airframe or the like and a part of the airframe is imaged or a case where the imager 10 is attached to image the lower side and the image of the ground is always captured.

Note that, in this case, if the object B3 is not detected based on the second image information D2, the object B1 is detected at the time t2, and the object B2 is detected at the time t3. Thus, the time difference Δt is t3–t2. When the time difference Δt is equal to or less than the approach determination threshold value th1, the approach of the object is determined to be detected, and the object approach signal S1 is out.

Moreover, the object B3 is detected based on the second image information D2 at the time t1 at first. Since the object B1 is detected at the time t2 and the object B2 is detected at the time t3, the determination of the presence or absence of the approach of the object by the time difference Δt is performed on the condition that that the object B1 and the object B2 are the same. In a case where the condition is met, the object approach signal S1 is out.

Furthermore, if the object B3 detected based on the second image information D2 is identified by the object recognizer 232 and clarified that the object B3 is different from the object BT which should be detected, the determination of the presence or absence of the approach based on the detection of the objects B1 and B2 may be performed even in this case.

Further, for example, in case where the object B3 is detected based on the second image information D2 only at the time t1 and the object B3 is not detected at the times t2 and t3, the object B3 is also considered to be different from the object BT which should be detected. In such a case, that is, in a case where the presence of the object B3 is detected first based on the second image information D2 corresponding to the lens group with the short focusing length L2, the detection of the object B1 can be not detected for a certain period of time thereafter. In this case, only in a case where the presence or absence of the object is detected first based on the first image information D1 corresponding to the lens group with the long focusing length L1, the detection of the presence or absence of the object based on the second image information D2 is performed.

In addition, the detection of the object based on the second image information D2 may be not performed until the object is detected from the first image information D1. In this way, the amount of computation is reduced, and the power consumption is reduced.

In the embodiments described above, the two image information images D1 and D2 are acquired by the two imaging elements, the first imaging element 16SC and the second imaging element 17SC, in the imagers 10, 10B and 10C. However, embodiments are not limited to this, and three or more image information images D may be acquired by using three or more imaging elements, and the detection of the presence or absence of an object and the detection of the approach of an object may be performed based on these images D.

That is, such an imager 10D includes, for example, N (N is an integer of 3 or more) lens groups which have different focal lengths from each other and are arranged so as to image the same target object, and N pieces of image information D1 to DN, which include the first image information D1, the second image information D2, the third image information D3 and so on to the N-th image information DN, are acquired by the N lens groups.

Then, for example, in the object detector 23, the presence or absence of an object is detected based on the N pieces of image information D1 to DN. The object approach determiner 24 determines the approach of the object has been detected when a time difference Δt between a time ta and a time tb is equal to or less than the approach determination threshold value th1. The time ta is when the image information is acquired when an object has been detected based on any one of the image information D1 to DN among the N pieces of image information D1 to DN. The time tb is when the image information is acquired when an object has been detected based on other image information.

Next, a schematic flow of a series of processing in the object approach detection device 1 will be described based on the flowchart shown in FIG. 13.

Figure 13:
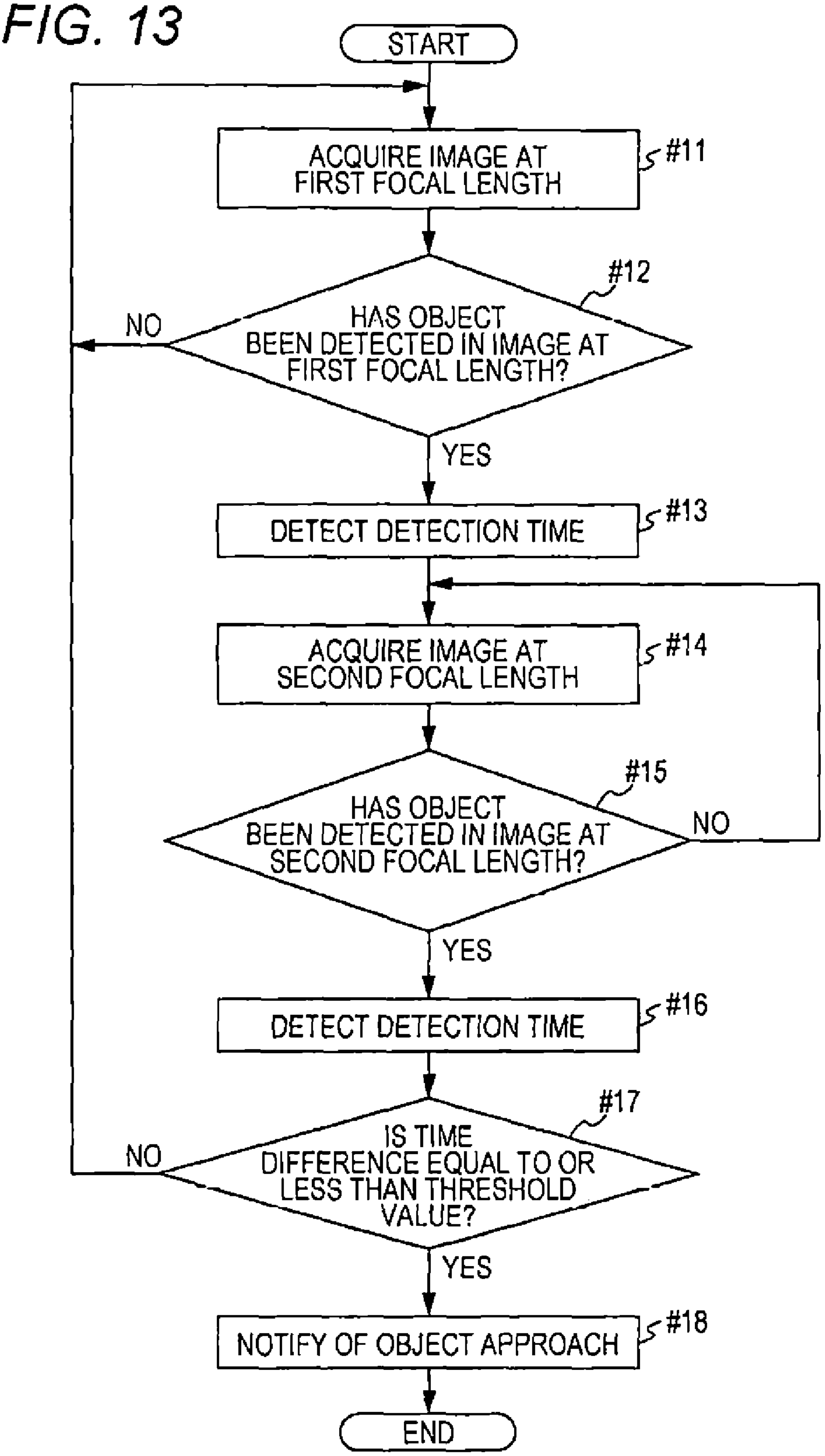
FIG. 13 is a flowchart showing a schematic flow of a series of processing in the object approach detection device.

In FIG. 13, the first image information D1 is acquired by the imager 10 (#11). The presence or absence of an object from the first image information D1 is checked (#12). When an object is detected (YES in #12), the first time ta is acquired from the time stamp DTS or the like (#13). The second image information D2 is acquired (#14), and the presence or absence of the object is checked (#15). When an object is detected (YES in #15), the second time tb is acquired (#16).

The time difference Δt between the first time ta and the second time tb is obtained and compared with the approach determination threshold value th1 (#17). When the time difference Δt is equal to or less than the approach determination threshold value th1, the approach of the object is determined to be detected, and the object approach signal S1 and the like are out (#18).

According to the embodiment described above, since the presence or absence of the approach is determined by performing the detection of an object to obtain the time difference Δt and comparing the time difference Δt with the approach determination threshold value th1, the amount of calculation is small, and thus the power consumption can be reduced. Incidentally, when the distance to the object is estimated as in the conventional case, the amount of calculation is large, and thus the power consumption cannot be reduced.

Therefore, according to the object approach detection device 1 of the present embodiment, when the object approach detection device 1 is mounted on a small flying machine such as a drone, the flight time thereof can be made longer.

When a combination of the main lens 11, the first lens group 13G and the second lens group 14G is used as the imager 10, the target range of the imaging is enlarged and the viewing angle is widened so that an object can be detected from various directions with lightweight equipment.

In the embodiments described above, the configuration, structure, combination, size, number, material, arrangement, content of a series of processing, order, threshold values th and the like of the whole or each part of the imagers 10, 10B and 10C, the processing unit 20 and the object approach detection device 1 can be changed as appropriate in accordance with the gist of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An object approach detection device comprising:

an imager that includes a first lens group and a second lens group which have different focal lengths from each other and are arranged so as to image a same target object and that acquires first image information and second image information imaged through the first lens group and the second lens group, respectively;

an object detector that detects presence or absence of an object based on the first image information and the second image information; and an object approach determiner that determines that an approach of the object has been detected when a time difference between a first time and a second time is equal to or less than an approach determination threshold value, the first time being when the first image information is acquired when the object has been detected based on the first image information, the second time being when the second image information is acquired when the object has been detected based on the second image information.

2. The object approach detection device according to claim 1, wherein the imager includes:

the first lens group that includes a plurality of first lenses having a first focal length;

a first imaging element that receives light having passed through the first lens group and outputs the first image information;

the second lens group that includes a plurality of second lenses having a second focal length; and a second imaging element that receives light having passed through the second lens group and outputs the second image information.

3. The object approach detection device according to claim 1, wherein the imager includes:

a main lens;

the first lens group that includes a plurality of first lenses having a first focal length;

a first imaging element that receives light having passed through the main lens and the first lens group and outputs the first image information;

the second lens group that includes a plurality of second lenses having a second focal length; and a second imaging element that receives light having passed through the main lens and the second lens group and outputs the second image information.

4. The object approach detection device according to claim 2, wherein the plurality of the first lenses and the plurality of the second lenses are arranged on one object plane, and the first imaging element and the second imaging element are arranged so as to face the object plane.

5. The object approach detection device according to claim 4, wherein each of the plurality of the first lenses and each of the plurality of the second lenses are arranged alternately on the object plane and arranged in a matrix as a whole, and a shielding wall that shields an optical path to outside of a corresponding region is provided between each of the first lenses and the second lenses and the first imaging element and the second imaging element.

6. The object approach detection device according to claim 1, wherein the object detector performs edge detection on the first image information and the second image information and detects the presence of the object when an edge equal to or greater than an edge detection threshold value has been detected.

7. The object approach detection device according to claim 1, wherein the object detector detects spatial frequencies of the first image information and the second image information and detects the presence of the object when the spatial frequencies are equal to or greater than a frequency detection threshold value.

8. The object approach detection device according to claim 6, wherein the object detector divides each of the first image information and the second image information into a plurality of regions and performs the edge detection on or detects the spatial frequencies of the image information in each of the regions.

9. The object approach detection device according to claim 8, wherein the object approach determiner determines that the approach of the object has been detected on a condition that a region in which the object has been detected corresponds to a region into which the first image information and the second image information are divided or is a region adjacent thereto.

10. The object approach detection device according to claim 1, wherein the object detector first detects the presence or the absence of the object based on image information corresponding to a lens group with a long focusing length among the first image information and the second image information and detects the presence or the absence of the object based on other image information only in a case where the presence of the object has been detected.

11. The object approach detection device according to claim 1, further comprising:

an object recognizer that perform image recognition based on the first image information and the second image information to recognize the object, wherein the object approach determiner determines that the approach of the object has been detected on a condition that objects recognized by the object recognizer are same.

12. The object approach detection device according to claim 1, wherein the object approach determiner determines that the approach of the object is not detected in a case where the object detector has detected the presence of the object based on image information corresponding to a lens group with a short focusing length prior to image information corresponding to a lens group with a long focusing length among the first image information and the second image information.

13. The object approach detection device according to claim 1, wherein the object approach determiner has a high-speed approach determination threshold value smaller than the approach determination threshold value and determines that high-speed approach of the object has been detected when the time difference is equal to or less than the high-speed approach determination threshold value.

14. The object approach detection device according to claim 1, wherein the imager includes N (N is an integer of three or more) lens groups that include the first lens group and the second lens group, have different focal lengths from each other and are arranged so as to image the same target object, and acquires N pieces of image information including the first image information and the second image information by the N lens groups, the object detector detects the presence or the absence of the object based on the N pieces of the image information, and the object approach determiner determines that the approach of the object has been detected when a time difference between a time when the image information is acquired when the object has been detected based on any one piece of the image information among the N pieces of the image information and a time when the image information is acquired when the object has been detected based on other information is equal to or less than the approach determination threshold value.

15. An object approach detection method comprising:

acquiring first image information and second image information respectively through a first lens group and a second lens group that have different focal lengths from each other and are arranged so as to image a same target object;

detecting presence or absence of an object based on the first image information and the second image information; and determining that an approach of the object has been detected when a time difference between a first time and second time is equal to or less than an approach determination threshold value, the first time being when the first image information is acquired when the object has been detected based on the first image information, the second time being when the second image information is acquired when the object has been detected based on the second information.

* * * * *